United States Patent [19]

Seib

[11] Patent Number: 4,620,784

[45] Date of Patent: Nov. 4, 1986

[54] PLANETARY CAMERA

[75] Inventor: Martin R. P. Seib, Wembley Park, United Kingdom

[73] Assignee: Imtec Management Information Technology Limited, Middlesex, United Kingdom

[21] Appl. No.: 593,639

[22] Filed: Mar. 26, 1984

[30] Foreign Application Priority Data

Apr. 21, 1983 [GB] United Kingdom ............... 8310875
Jul. 5, 1983 [GB] United Kingdom ............... 8318154

[51] Int. Cl.$^4$ ..................... G03B 32/00; G03B 17/50
[52] U.S. Cl. ........................................ 355/27; 355/63; 354/83
[58] Field of Search ............ 354/83, 88, 89, 90, 354/91, 92, 93, 307, 312–316; 355/27, 50, 55, 63

[56] References Cited

U.S. PATENT DOCUMENTS 1,451,159  4/1923  Greene ............................... 354/312
2,664,038 12/1953  Canham .............................. 355/27
3,282,150 11/1966  Burton ............................... 355/28
3,697,173 10/1972  Sasaki et al. ......................... 355/27
3,945,727  3/1976  Nakajima et al. .................... 355/27
4,259,007  3/1981  Arai et al. ........................... 355/27

FOREIGN PATENT DOCUMENTS 2006972  5/1979  United Kingdom .

Primary Examiner—A. A. Mathews
Attorney, Agent, or Firm—Dann, Dorfman, Herrell & Skillman

[57] ABSTRACT

The camera head of a planetary camera system is movably mounted on a frame of the system. Film members (e.g. aperture cards) are exposed in the camera head. A stationary film-processing station is mounted on the frame in a position remote from the camera head and is linked to the camera head by a light-tight extensible film member conveying means. Telescopic tubes containing endless conveyor belts of variable effective length are preferred for the conveying means.

9 Claims, 10 Drawing Figures

PLANETARY CAMERA

BACKGROUND OF THE INVENTION

This invention relates to an improved planetary camera system.

It is known to expose aperture cards in a movable camera head and then subsequently to process the exposed cards directly in the camera head.

SUMMARY OF THE INVENTION

This invention, in one aspect, relates to an improved planetary camera system in which light-tight transporting means is provided to convey exposed aperture cards from a movable camera head of the system to a stationary film-processing station of the system.

Conveniently the light-tight transporting means comprises an extensible/contractable (e.g. telescopic) tubular member which links the camera head to a fixed region of a support frame of the head. The tubular member conveniently houses at least one endless card-conveying belt for transporting the exposed card through the tubular member. Preferably there are two pairs of opposed belts (one pair engaging the card on opposite sides adjacent to one longitudinal edge and the other pair adjacent to the opposite edge) and each belt comprises a double loop so that the overall length of the conveying run of each belt can change without there being any need for the overall length of each belt to change.

The end of the transporting means adjacent to the camera head can be adapted to receive an exposed card from the outlet end of an automatic card feed system within the camera head that takes cards one at a time, on demand from a camera operator, holds them in an exposure station (behind the camera lens) for correct exposure, and feeds them away from the exposure station at the conclusion of the exposure.

The end of the transporting means adjacent to the processing station would normally cater for downward movement of the cards and free fall can be permitted between an output end of a transverse conveying means removing exposed cards from the camera head and an input end of a conveying means passing through the processing station.

If required a 90° or 180° turn of cards can be effected during the downward movement, and where free fall is employed this is conveniently effected in one or two 90° stages.

BRIEF DESCRIPTION OF THE DRAWINGS

One embodiment of camera system in accordance with the invention will now be described, by way of example, with reference to the accompaying drawings, in which.

DESCRIPTION OF THE PREFERRED EMBODIMENT

Figure 1:
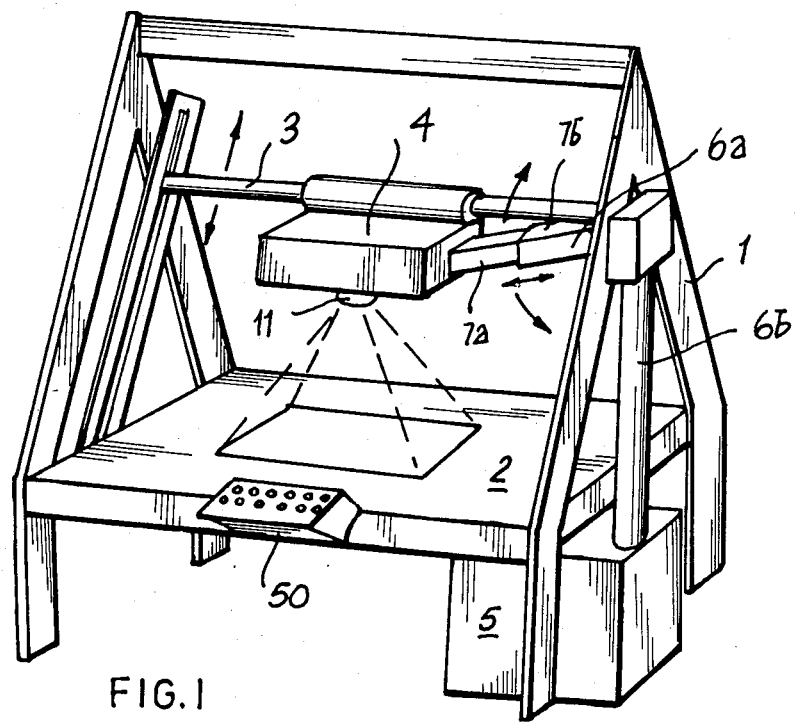
FIG. 1 shows a general view of the complete system.

The camera system shown in FIG. 1 comprises an A-frame 1 supporting a copy board 2 and movable above the copy board 2 on a beam 3, a camera head 4. As is known, the drawing to be copied is placed face upwards on the board 2, illuminated (with lights not shown) and the beam 3 and camera head 4 are moved vertically up or down above the board 2 to get the required reduction ratio for the drawing in question. An aperture card from a magazine in the camera head 4 (shown in FIG. 3) is then exposed in the head 4, and the exposed card has to be developed before it can be exposed to light again.

In prior art arrangements the film-processing station has been included in the head 4 but this now appears not to be the best location for it.

In the system shown in FIG. 1, the film-processing station (5) is located below the board 2 and the exposed cards are automatically (and under light-free conditions) led from the head 4 to the station 5 by a transfer means 6a, 6b.

The transfer means 6a is movable with the head 4, and is provided by a telescopic pair of tubes 7a, 7b (see FIG. 4) containing endless belt drives, tube 7a being pivoted to the head 4 and tube 7b to the frame 1. The transfer means 6b allows near-vertical free fall which includes two 90° turns of the cards (to ensure the emulsion side of the film is the correct way up for processing in the station 5).

Figure 2:
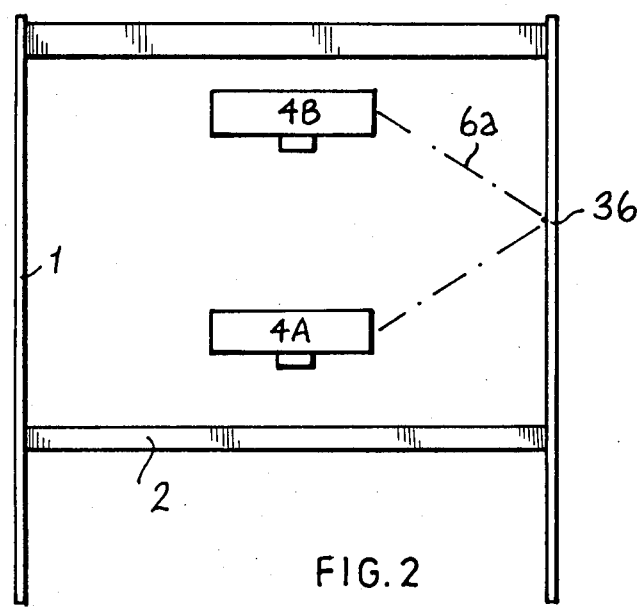
FIG. 2 shows schematically how the camera head is linked to the frame of the system by a telescopic tubular member.

To minimise the percentage change in length of the transfer means 6a from the lowest position of the head 4 (shown at 4A in FIG. 2) to the highest position of the head 4 (shown at 4B in FIG. 2), the tube 7b is pivoted to the frame 1 roughly mid-way between these lowest and highest positions.

Figure 3:
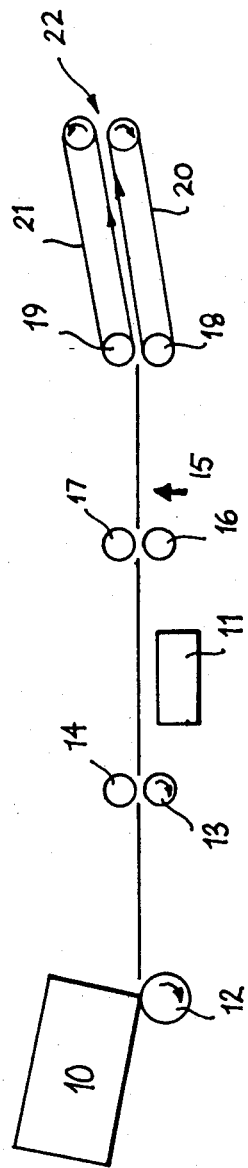
FIGS. 3 to 5 show schematically how cards move in different stages of the transporting means.

FIG. 3 shows how unexposed aperture cards (emulsion side down) move one-by-one from a reservoir 10 to the exposure station behind the lens 11. A pair of rollers 12 engage the card to remove it from the bottom of the reservoir and forward it to a second pair of driven rollers 13. Light idler rollers 14 rest on the conveyed card adjacent its edges, the rollers 13, 14 together giving a light sideways urge to the cards to ensure they engage a side register surface. A solenoid-energised stop means 15, holds a card in the exposure station during exposure and then releases it to be carried forward by twin roller pairs 16, 17 and 18, 19. On leaving the roller pairs 18, 19 the edges of the card are trapped between pairs of endless belts 20, 21 and led to the outlet 22 of the camera head 4.

Figure 4:
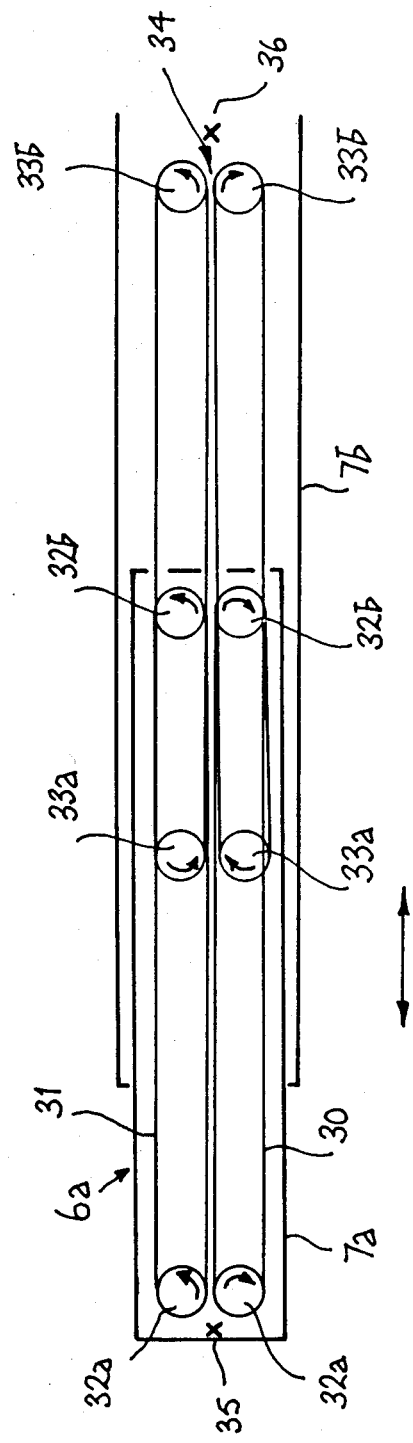

FIG. 4 shows the telescoping tubes 7a, 7b and two of the four endless belts 30, 31 included therein. Each belt forms a double loop around four rollers, two 32a, 32b, mounted on tube 7a and two 33a, 33b mounted on the tube 7b. Thus as the tubes 7a, 7b telescope, to accommodate for vertical movements of the head 4, the conveying run of each belt 30, 31 varies without significantly altering the tension in each belt. The outlet of the tube 7b is shown at 34 and the pivot axes of the tubes 7a, 7b to the head 4 and frame 1, respectively are shown at 35 and 36. The joints between the tubes 7a, 7b and between tube 7a and the head 4 and tube 7b and the frame 1 are protected from light ingress by felt pads or the like.

Figure 5:
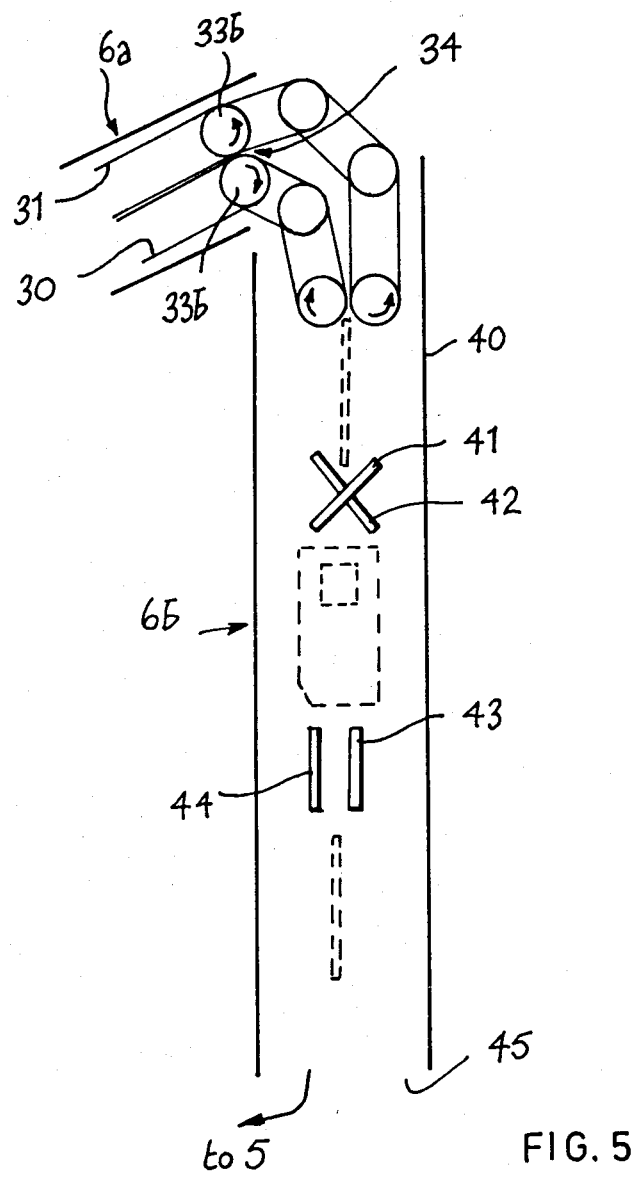

The card drops from the outlet 34 into a light-tight tube 40 shown in FIG. 5, where it meets two spaced-apart edges 41, 42 inclined to one another in parallel spaced-apart planes. As the leading end of the falling card meets the edges 41, 42, the card turns through 90° about a generally vertical axis to pass between them.

A second pair of inclined spaced-apart edges 43, 44 cause the card to make an additional 90° turn so that as it reaches the outlet 45 of the tube 40 it is ready to be bent through 90° and pass horizontally into the station 5, emulsion side down for chemical processing by sprays from below.

By coupling the drives for the various rollers and belts used for card transport, accurate synchronisation of movement is possible to provide for fully automatic operation.

FIG. 1 also shows a control panel 50 which can be used to control the system and also to print a suitable code designation on each card processed in the station 5.

Figure 6:
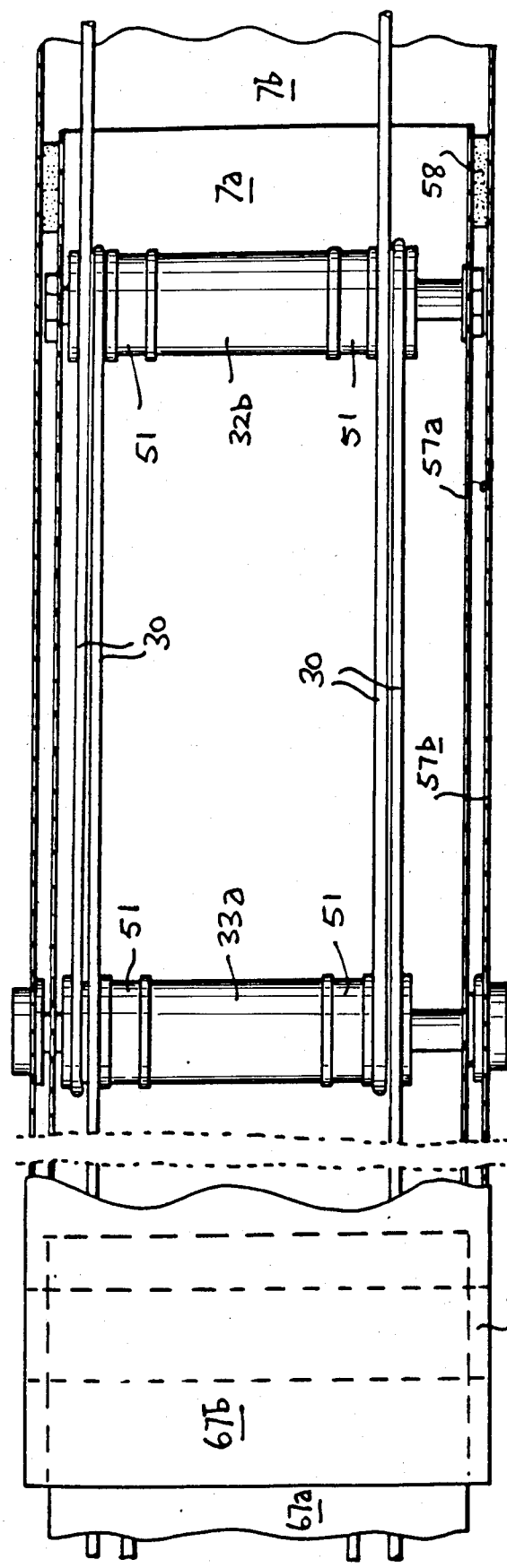
FIG. 6 is a partially sectioned plan view of part of the central region of the telescopic member sectioned on the transporting plane of the aperture cards therethrough (i.e. on the line VI—VI in FIG. 7)
Figure 7:
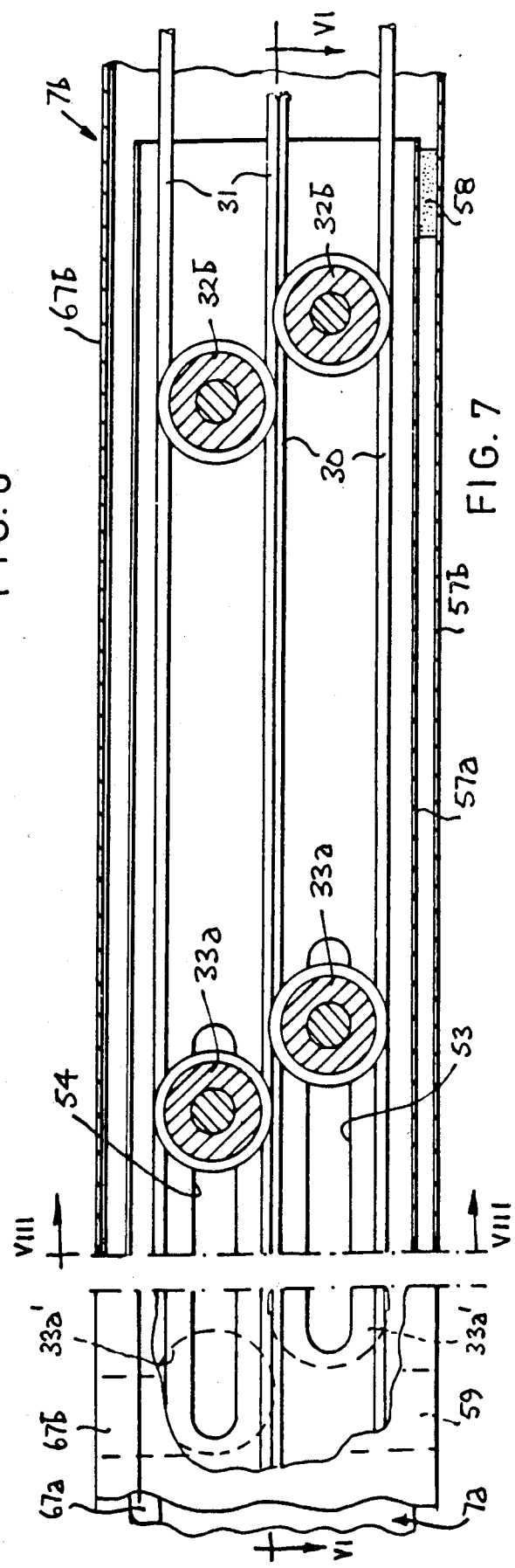
FIG. 7 is a sectional side elevation of the central region shown in FIG. 6 when the member is near its maximum length.
Figure 8:
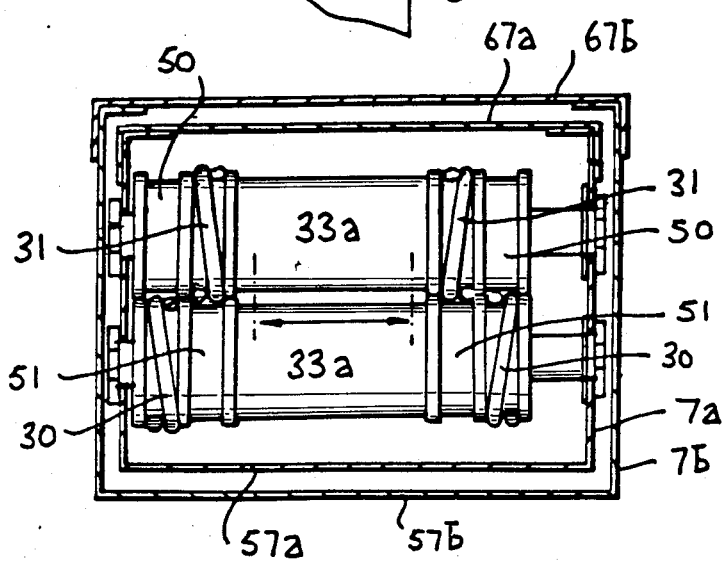
FIG. 8 is a cross-sectional view on the line VIII—VIII of FIG. 7.

From FIGS. 6, 7 and 8 it can be seen that each tube 7a, 7b of the telescopic transfer means 6a is formed from a generally rectangular channel section 57a, 57b, closed by a removable lid 67a, 67b. The lid 67a does not extend the full length of the tube 7a, since the lid serves to provide a light-tight cover to the tube and is not required on that part of the tube 7a which is never withdrawn from the tube 7b. The light sealing pads between the tubes 7a and 7b are shown at 58, 59 in FIGS. 6 and 7.

The eight rollers 32a, 32b, 33a and 33b are all of a similar design and each exhibits an outer pair of edge grooves 50 and an inner pair of edge grooves 51. The lower belts 30 run in the grooves 50 of the four lower rollers and the upper belts 31 run in the grooves 51. This arrangement ensures that the aperture card is nipped between the two belts 30, 31 adjacent to each long edge of the card, in its transportation through the tubes 7a, 7b. The film covered window of each card will occupy the position X between the two chain lines in FIG. 8 and will thus not be contacted by anything during its transportation from the exposure station to the film processing station 5.

From FIG. 7 it can be seen that the rollers 33a pass through elongate slots 53, 54 in the channel section 57a and this permits the necessary telescoping movement between the tubes 7a and 7b. The position of the rollers as shown in FIG. 7 represents the maximum length of the transfer means 6a (i.e. when the camera head 4 is at its lowest or highest position) and the chain line positions 33a' in FIG. 7 represent the position of the rollers in the slots 53, 54 when the camera head 4 is in the mid position.

Figure 9:
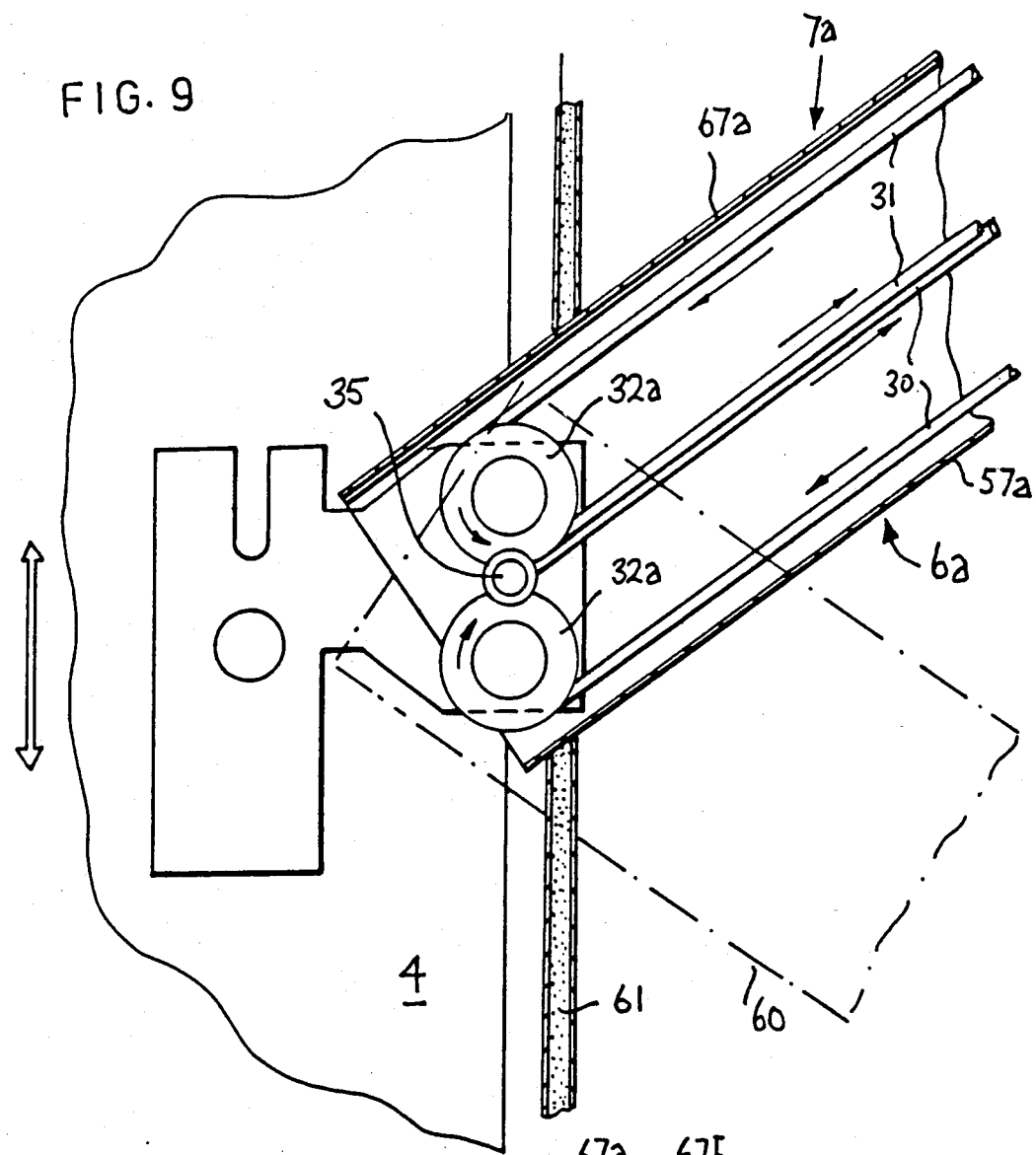
FIG. 9 is a partial section showing the inlet to the telescopic section.

FIG. 9 shows the inlet end of the transfer means 6a with the camera head 4 in its lowest position and the chain line 60 in FIG. 9 shows the relative position of the tube 7a when the camera head 4 is in its highest position. It will be noted that the plane of an aperture card nipped between the belts 30 and 31 adjacent to the rollers 32a (i.e. at the inlet end of the transfer means 6a) passes through the pivoting axis 35 of the tube 7a, so that smooth feed of cards from the outlet 22 of the camera head transportation system (not shown in FIG. 9) to the belts 30, 31, will always occur.

One or more light-masking sheets 61 are provided adjacent the joint between the tube 7a and the camera head 4 to prevent light ingress when there is relative movement therebetween.

Figure 10:
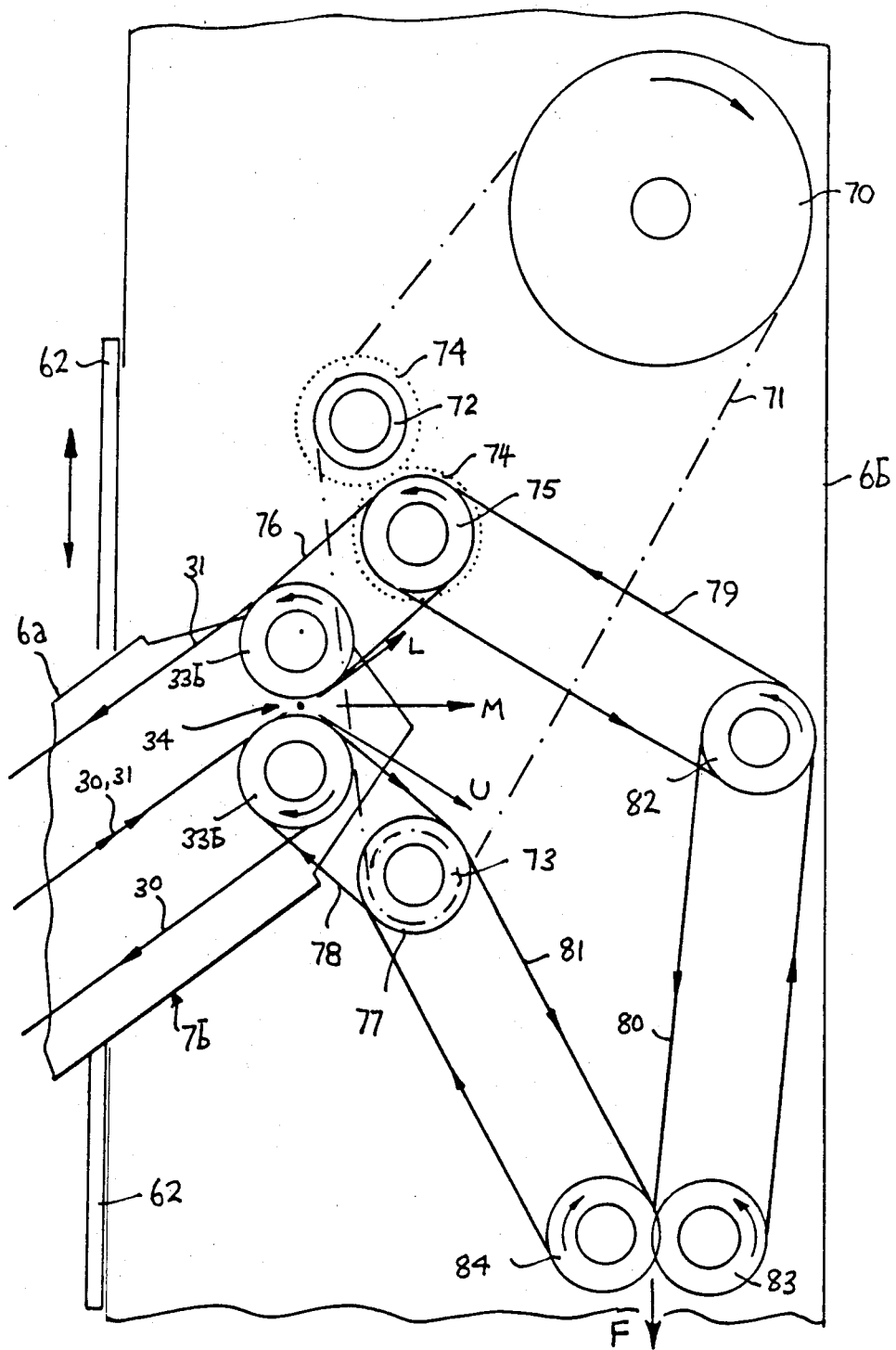
FIG. 10 is a partial section showing the outlet of the telescopic section.

FIG. 10 shows, in greater detail, the outlet end of the transfer means 6a and the way in which the belts 30, 31 are driven.

A motor (not shown) drives a main pulley 70 and a drive belt 71 and the latter engages pulleys 72 and 73. Toothed wheels 74 transmit the drive from the pulley 72 to a four-grooved belt roller 75 and a pair of endless belts 76 (only one shown) link the roller 75 with the upper roller 33b at the outlet end of the transfer means 6a. Since the belt 31 uses the grooves 51 in the roller 33b the belts 76 can use the grooves 50. This arrangement ensures that the pulley 70 drives the belt 31.

The pulley 73 is fast with a further four-grooved belt roller 77 which, via a pair of endless belts 78 drives the lower roller 33b and thus the belt 30. The belts 78 locate in the grooves 51 in the lower roller 33b.

When aperture cards reach the end of their transportation between the two pairs of belts 30, 31, they move into a space defined by the two pairs of belts 76, 78 and three further pairs of belts 79, 80 and 81. If the camera head 4 is in its lowest position, the aperture cards will enter this space in the direction of the arrow L. If the camera head 4 is in the middle or uppermost positions the entry directions will, respectively, be represented by the arrows M or U. In each case the leading end of the card will contact one of the pair of belts 79 or 80 and will thus be fed down between the four belts 80, 81 to pass, in the direction of the arrow F further into the transfer means 6b.

The belts 79 are carried by the belt roller 75 and a four-grooved belt roller 82 and the belts 80 and 81 pass around four-grooved belt rollers 83 and 84, respectively.

To ensure a light-tight connection between the transfer means 6a and 6b, light masking sheets 62 are used.

Although two 90° turns are imparted to each card during its transit of the means 6b in the illustrated arrangement by realigning the card transport path within the station 5 it is possible to operate with just one 90° turn.

Other modifications of the illustrated embodiment are clearly possible within the scope of the following claims.

What is claimed is:

1. A planetary system including
   a frame on which an object of which a permanent image is required can be placed,
   a camera head movably mounted on the frame for exposing a light-sensitive film member to a light image of the object,
   a film-processing station of the system in which exposed light-sensitive film of the member is processed to produce the required permanent image.
   the film processing station being mounted on the frame remote from the camera head, and
   a light-tight transporting means for an exposed film member interconnecting the station and the head, said transporting means comprising a telescopic tubular member containing a pair of opposed endless conveyors between confronting flights of which the film member moves for transporting the exposed film member, at least the confronting flight of each conveyor in the telescopic tubular member including a loop whose size varies as the tubular member telescopes.

2. A camera as claimed in claim 1, in which the side region of the frame is connected to the film processing station by a vertically-extending member fixed relative to the frame.

3. A camera system as claimed in claim 1, in which the frame supports a copy board below the camera head on which copy board the object is placed, the film-processing station being located below the board.

4. A camera system as claimed in claim 3, in which a control panel is provided adjacent to the board to control the system and also to program the printing of a suitable designation on each film member processed in the station.

5. In a planetary camera comprising a board on which copy to be photographed is placed, a frame means supporting said board, a camera head, means mounting the camera head for movement upwards and downwards above the board, reservoir means within the camera head containing a plurality of aperture cards, each said card having an aperture therein across which aperture is supported a light-sensitive film member, a lens system in the camera head for focussing an image of copy on the board on to the film member of an aperture card held in an exposure station of the camera head, a film-processing station in which the film member of a card, exposed to light via the lens system of the camera head, can be developed, and light-tight transport means for feeding aperture cards one-by-one from the reservoir means to the exposure station and then from the exposure station to the film-processing station, the improvement which comprises locating the film-processing station in a fixed position on the frame means and making at least a part of the light-tight transport means between the exposure station and the film-processing station of telescoping tubes housing conveying means of varying length.

6. A planetary camera as claimed in claim 5, in which the telescoping tubes are pivotally mounted at one end to the camera head and at the other end to the frame means.

7. A planetary camera as claimed in claim 6, in which the downstream tube of the telescoping tubes is in communication with a vertically disposed tube which allows an aperture card to pass downwardly to the processing station which is located below the level of the said board.

8. A planetary camera as claimed in claim 7, in which the vertically disposed tube is, arranged so that, for at least a substantial part of the movement of an aperture card along said vertically disposed tube, the said card is falling under gravity.

9. A planetary camera as claimed in claim 8, in which means is provided to turn each card, about its axis aligned with its falling direction, as the said card moves down the vertically disposed tube.

* * * * *